(12) United States Patent
Arnaud et al.

(10) Patent No.: US 10,382,227 B2
(45) Date of Patent: Aug. 13, 2019

(54) METHOD FOR VERY HIGH THROUGHPUT SATELLITE DATA TRANSMISSION

(71) Applicant: THALES, Courbevoie (FR)

(72) Inventors: Mathieu Arnaud, Toulouse (FR); Cédric Baudoin, Toulouse (FR); David Niddam, Toulouse (FR); Patrick Lautier, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/619,179

(22) Filed: Jun. 9, 2017

(65) Prior Publication Data
US 2017/0366372 A1 Dec. 21, 2017

(30) Foreign Application Priority Data

Jun. 16, 2016 (FR) ..................... 16 00959

(51) Int. Cl.
| | |
|---|---|
| *H04L 12/46* | (2006.01) |
| *H04B 7/15* | (2006.01) |
| *H04B 7/185* | (2006.01) |
| *H04L 12/66* | (2006.01) |
| *H04L 29/06* | (2006.01) |

(52) U.S. Cl.
CPC ......... *H04L 12/4633* (2013.01); *H04B 7/15* (2013.01); *H04B 7/18517* (2013.01); *H04B 7/18582* (2013.01); *H04L 12/66* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,781,968 B1 | 8/2004 | Colella et al. | |
| 2007/0097852 A1 | 5/2007 | Thesling | |
| 2009/0022085 A1* | 1/2009 | Dankberg | H04B 7/18582 370/316 |
| 2012/0163299 A1* | 6/2012 | Chen | H04W 56/004 370/328 |
| 2012/0224646 A1* | 9/2012 | Purohit | H04L 5/06 375/259 |
| 2014/0064280 A1 | 3/2014 | Qin et al. | |
| 2018/0234525 A1* | 8/2018 | Deshpande | H04L 69/22 |

* cited by examiner

*Primary Examiner* — Alex Skripnikov
*Assistant Examiner* — Sharmin Chowdhury
(74) *Attorney, Agent, or Firm* — Baker & Hostetler LLP (57) ABSTRACT

A method comprises a preprocessing step consisting, in the gateway station, in pre-segmenting the data as a function of the carrier frequency which is dedicated to them on the downlink DL, in reassembling and in encapsulating the pre-segmented data in successive basic frames DL BB-Frames, that can be transmitted over the downlink, each basic frame DL BB-Frame of the downlink being encapsulated by addition of a specific transport header DL BB-TH on the downlink and a data field, and a step consisting, in the gateway station, in incorporating the different basic frames DL BB-Frames of the downlink in the data field of the different basic frames UL BB-Frames of the uplink.

4 Claims, 7 Drawing Sheets

METHOD FOR VERY HIGH THROUGHPUT SATELLITE DATA TRANSMISSION

CROSS-REFERENCE TO RELATED APPLICATIONS

This application claims priority to foreign French patent application No. FR 1600959, filed on Jun. 16, 2016, the disclosure of which is incorporated by reference in its entirety.

FIELD OF THE INVENTION

The present invention relates to an improved satellite data transmission method. It applies to any satellite telecommunication system and in particular to very high throughput transmission systems of HTS or VHTS (very high throughput satellite) type.

BACKGROUND

A satellite telecommunication system comprises uplinks between gateway stations GS and an OBP processor (on board processor) mounted on board a satellite and downlinks between the OBP processor and user terminals. Generally, the uplink has a link budget, that is to say a signal-to-noise ratio, which is much better than the downlink. The OBP processor can be a transparent processor or a regenerative processor.

In the case where the OBP processor is transparent, the waveform used to transmit the data is modulated on the ground in the gateway station before being transmitted to the satellite. The processor on board the satellite receives and retransmits the waveform to the user terminals without processing it. However, in the very high throughput transmission systems, the use of a transparent processor is often unsuitable for transporting the necessary high throughput, because of a lack of frequency resources. To mitigate this problem, the current trend is to use wider frequency bands like the V and Q bands, but that causes the link budget to be degraded. In effect, the higher the frequency, the more severe the atmospheric attenuation phenomena. This necessitates the use of geographical diversity mechanisms, which leads to an increased complexity of the equipment used in the gateway station and greatly increases the cost of the transmission system.

In the case where the OBP processor is regenerative, the gateway station modulates the radiofrequency signals to be transported and converts them into a digital form before transmitting them over the uplink, to the satellite. The regenerative OBP processor therefore comprises equipment for demodulating the digital data received, a routing device, and equipment for re-modulating the data before transmitting them over the downlink, to the user terminals. The current regenerative processors are very complex because, because of the stack of the protocol layers used for the transmission of the data, it is necessary to perform, on board the satellite, a complete demodulation of the data received over the uplink, a switching and a routing of all the IP packets, then a complete re-modulation of the data to be transmitted over the downlink. Since the processing operations on board the satellite are performed on each IP packet, they are intensive and complex and require very significant on board computation power and processing power, which leads to electrical consumption and heat dissipation that are all the greater when the throughput of the data to be transmitted is high. The problem is that the processing capacity and the power available on board a satellite is limited and is not suited to very high throughputs.

SUMMARY OF THE INVENTION

The aim of the invention is to remedy the drawbacks of the known data transmission methods, to reduce the complexity of the processing operations performed on board the satellite, to reduce the computation and processing power needed on board the satellite, and to increase the spectral efficiency of the uplink.

For that, the invention relates to a satellite data transmission method in which the data to be transmitted over the downlink are preprocessed and pre-encoded in the gateway station and in which the stack of the protocol layers transmitted over the uplink is modified so as to incorporate, on the one hand, the preprocessed and pre-encoded data by taking account of the coding rate and the modulation type to be transmitted by the downlink, and on the other hand to signal to the OBP on board the satellite, the carrier frequency, that is to say the modulator, with which the preprocessed data to be transmitted over the downlink have to be modulated, and with which coding rate and which modulation type, the coding rate and modulation type information being information transmitted by the gateway station.

According to the invention, the method for transmitting data by satellite between a gateway station and user terminals, the data being transmitted to the satellite by the gateway station over an uplink UL in the form of a succession of frames and retransmitted by the satellite over a downlink DL to the user terminals, the retransmission of the data over the downlink DL being performed after modulation with a carrier frequency dedicated to the corresponding downlink DL, the method consisting, in the gateway station, in segmenting, assembling and encapsulating the data in different successive basic frames UL BB-Frames, that can be transmitted over the uplink, each basic frame UL BB-Frame comprising a header field UL BBHeader, dedicated to the uplink UL, and a data field UL DATAFIELD to be sent over the uplink UL, then in coding and in modulating the data of each basic frame UL BB-Frame to construct frames UL PL-Frames and in sending the UL PL-Frames over the uplink UL, characterized in that the method further comprises:

a first additional preprocessing step consisting, in the gateway station, in pre-segmenting the data as a function of the carrier frequency which is dedicated to them on the downlink DL, in reassembling and in encapsulating the pre-segmented data in successive basic frames DL BB-Frames, that can be transmitted over the downlink, the encapsulation of each basic frame DL BB-Frame of the downlink consisting in adding a transport header DL BB-TH dedicated to the downlink, and a second additional step consisting, in the gateway station, in incorporating the different basic frames DL BB-Frames of the downlink, associated with their respective transport headers DL BB-TH, in the data field of the different basic frames UL BB-Frames of the uplink.

Advantageously, the transport header DL BB-TH of each frame DL BB-Frame of the downlink comprises instructions intended for an OBP processor mounted on board the satellite, the instructions comprising at least one identification parameter DL Id of a modulator/coder to be used on the downlink, an identifier of the carrier frequency to be used, a start parameter and an end parameter indicating the start and the end of the corresponding frame DL BB-Frame, and a length parameter of the corresponding frame DL BB-Frame.

Advantageously, when a frame DL BB-Frame has a length greater than the length of the data field available in the UL BB-Frame of the uplink, the first additional preprocessing step further consists in fragmenting the corresponding frame DL BB-Frame into several fragments, then in encapsulating each fragment with a corresponding transport header DL BB-TH, and, the second additional step consists in incorporating the different fragments of the fragmented frame DL BB-Frame in different consecutive frames UL BB-Frames of the uplink.

Advantageously, the method further consists, on board the satellite, in receiving the UL PL-Frames, in demodulating and decoding the data of the frames UL PL-Frames received to extract from them the UL BB-Frames then, from each UL BB-Frame, in extracting the fragments of DL BB-Frames and in reassembling the fragments to reconstruct the complete DL BB-Frames, in routing each DL BB-Frame to the modulator/coder corresponding to the identifier DL Id indicated in the transport header DL BB-TH of said DL BB-Frame, then in transmitting the modulated and coded frames over the downlink DL.

BRIEF DESCRIPTION OF THE DRAWINGS

Other particular features and advantages of the invention will clearly emerge from the rest of the description given by way of purely illustrative and non-limiting example, with reference to the attached schematic drawings which represent.

DETAILED DESCRIPTION

Figure 1:
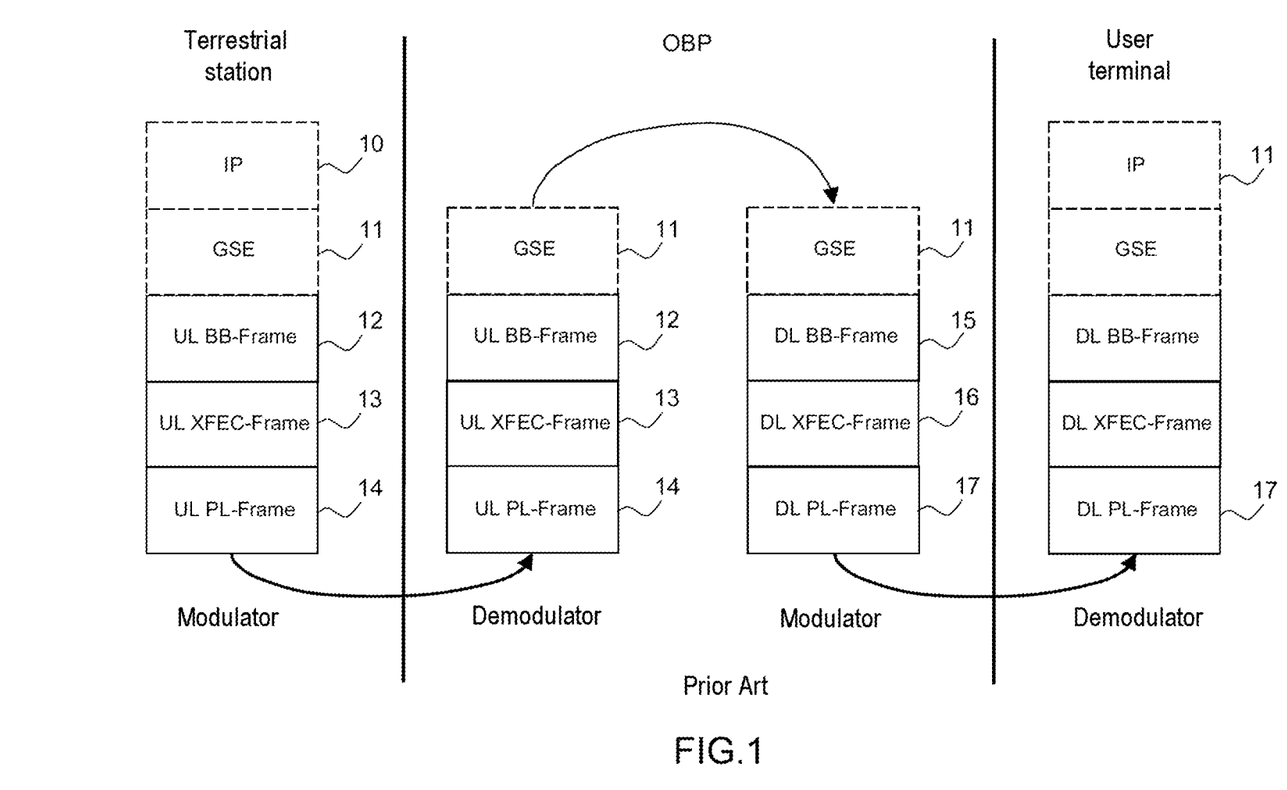
FIG. 1: an example of a stack of the protocol layers according to the DVB-S2 standard, transmitted by a gateway station, received and transmitted by a transmitter/receiver on board a satellite and received by a user terminal, according to the prior art.
Figure 2:
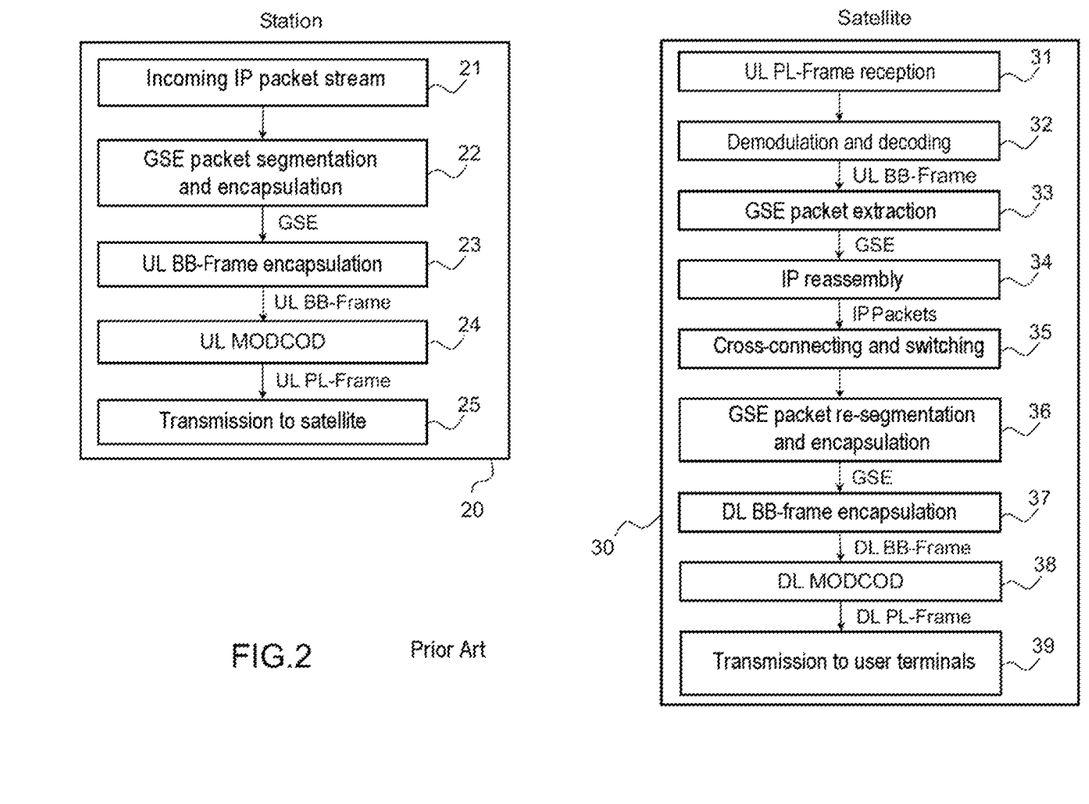
FIG. 2: a block diagram of an example of a satellite data transmission method, the method being called "completely regenerative", according to the prior art.

FIG. 1 illustrates an example of a stack of the protocol layers, transmitted by a gateway station, received and transmitted by a receiver/transmitter on board a satellite and received by a user terminal, according to the prior art. In this example, the stack of the protocol layers uses the DVB-S2 (digital video broadcasting-second generation) standard. The diagram comprises four different columns. The column on the left shows the stack of the successive protocol layers transmitted by a gateway station, the two central columns represent the stack of the successive protocol layers received by the receiver/transmitter on board the satellite and respectively the stack of the successive protocol layers retransmitted to the users after processing on board the satellite, the column on the right illustrates the stack of the successive protocol layers received by the users. FIG. 2 illustrates a block diagram of an example of a satellite data transmission method, the method being called "completely regenerative", according to the prior art. In the gateway station 20, the incoming data stream 21 is made up of IP packets 10. The IP packets 10 represented at the top of the stack of the protocol layers are segmented and encapsulated 22 by the addition of a first header to form GSE (generic stream encapsulation) packets 11, then each GSE packet 11 is encapsulated 23 again by the addition of a second header to form a basic frame called UL BB-Frame 12 (uplink-baseband frame). Then, the UL BB-Frame 12 is encoded and modulated 24 by a modulator/coder UL MODCOD intended to introduce an error correcting code to obtain the UL XFEC-Frame 13 (forward error correction frame), then in modulating the UL XFEC-Frame by a carrier frequency to obtain the UL PL-Frame 14 (physical layer frame) which is transmitted 25 to the satellite 30, by the gateway station 20, over the uplink. In the satellite 30, the UL PL-Frame 14 is received 31 by a receiver comprising a demodulator which demodulates it and decodes it 32 completely to recover the UL BB-Frame 12 which is then transmitted to the on board processor OBP where it is processed to extract 33 from it the GSE packets 11. In the OBP, all the GSE packets 11 must then be reassembled 34 to extract the IP packets to which processing operations 35 comprising cross-connect and switching operations are then applied. After processing in the OBP, the IP packets are re-segmented and encapsulated 36 by the addition of a first header to reform GSE packets, then each GSE packet is encapsulated 37 again by the addition of a second header to form a basic frame called DL BB-Frame 15 (down link-baseband frame). The DL BB-Frame 15 is then re-encoded to form a DL XFEC-Frame 16, then re-modulated 38 in a modulator/coder DL MODCOD to obtain a DL PL-Frame 17 that can be transmitted 39 by a transmitter, to user terminals, over a downlink. The user terminals receive the DL PL-Frame 17 that they decode and demodulate to extract from them the IP packets 10.

Figure 3:
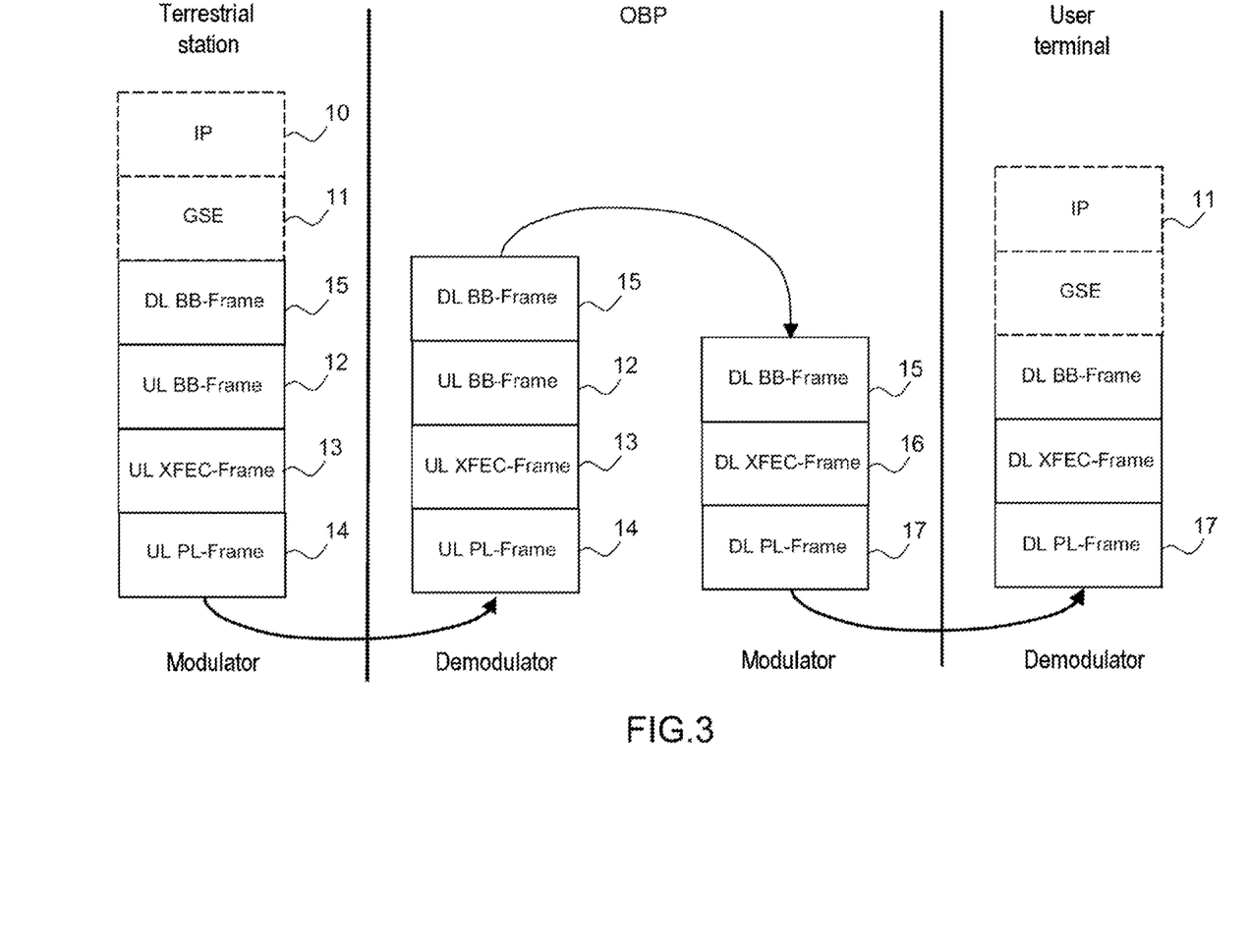
FIG. 3: an example of a stack of the protocol layers conforming to the DVB-S2 standard, transmitted by a gateway station, received and transmitted by a transmitter/receiver on board a satellite and received by a user terminal, according to the invention.
Figure 4:
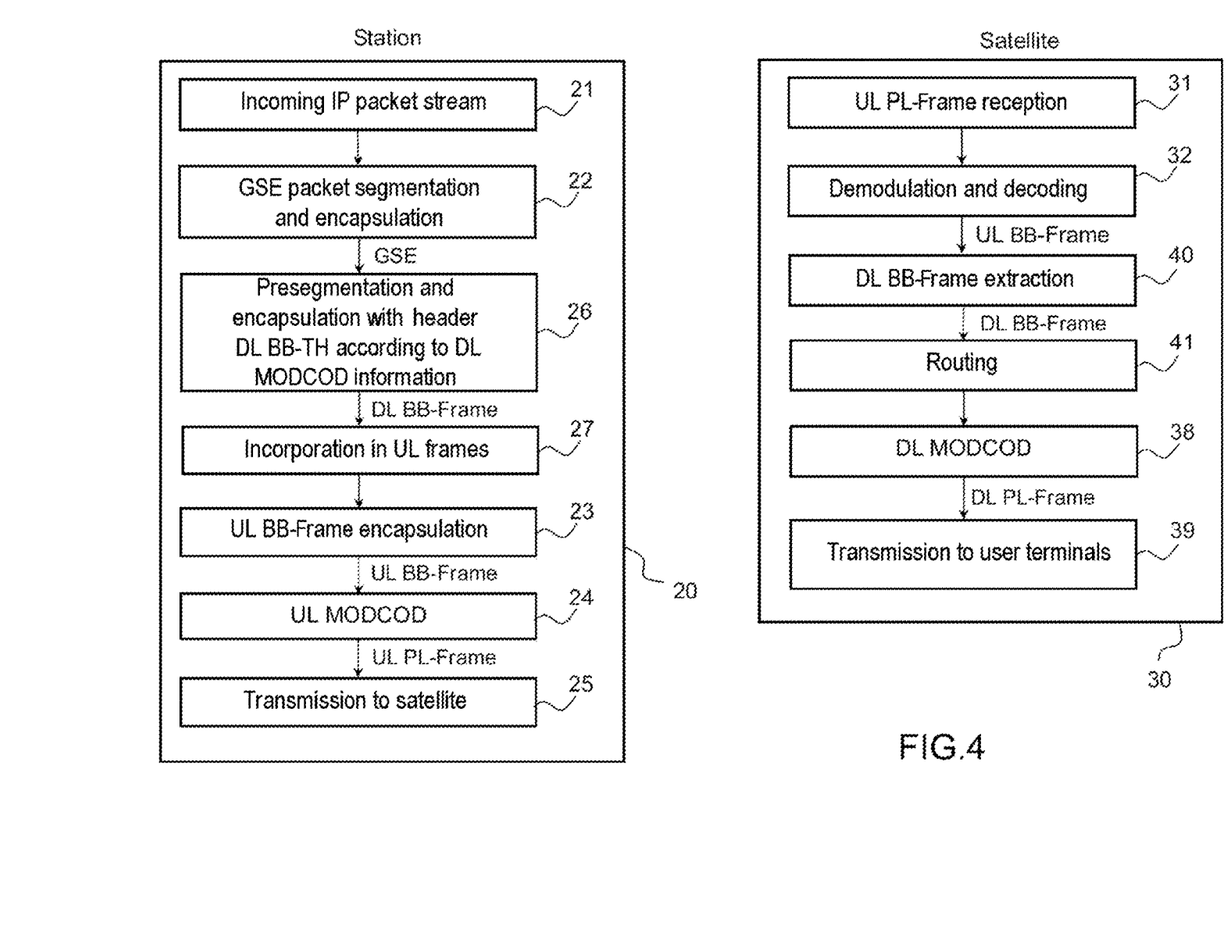
FIG. 4: a block diagram of an example of an improved satellite data transmission method, according to the invention.

FIG. 3 illustrates an example of a stack of protocol layers, transmitted by a gateway station, received and transmitted by a receiver/transmitter on board a satellite and received by a user terminal, according to the invention. In this example, the stack of the protocol layers uses the DVB-S2 standard. FIG. 4 illustrates a block diagram of an example of an improved satellite data transmission method, according to the invention. In the gateway station 20, the incoming data stream 21 is made up of IP packets 10. The IP packets 10 are segmented and encapsulated 22 by the addition of a first header to form GSE packets 11. Then, instead of transmitting, over the uplink, GSE packets in the UL BB-Frame, to minimize the processing operations to be performed on board the satellite, according to the invention, the GSE packets 11 are preprocessed 26 in the gateway station, so as to place them in the form of frames DL BB-Frames 15 that can be transmitted over the downlink. The size of the data for each DL BB-Frame depends on the coding rate and on the modulation type of the downlink. Furthermore, the stack of the protocol layers transmitted over the uplink is modified so as, on the one hand, to incorporate, in the UL BB-Frames, the DL BB-Frames to be transmitted over the downlink, and, on the other hand, to further incorporate, in the UL BB-Frames, an additional transport header DL BB-TH (baseband-transport header) associated with each DL BB-Frame to notably indicate to the OBP the carrier frequency, that is to say the modulator, with which the DL BB-Frames to be transmitted over the downlink must be modulated and to indicate the required coding rate and modulation type. Thus, as FIG. 4 shows, in the gateway station 20, the improved data transmission method comprises an additional first step and an additional second step. The first additional step 26 is a pre-processing step, performed on the GSE packets 11, consisting, in order, in reassembling the GSE packets, then in pre-segmenting and in encapsulating the data to form DL BB-Frames 15. The encapsulation of the data of each DL BB-Frame consists in adding, in front of the data field of each DL BB-Frame, a specific transport header, called DL BB-TH (BB-transport header). The pre-segmentation into DL BB-Frame is performed as a function of the carrier frequency to be used to transport the corresponding data over the downlink. The second additional step 27 consists in incorporating the successive DL BB-Frames, associated with their respective transport header DL BB-TH, in the data field of the successive frames of the uplink UL. The data of each frame of the uplink UL are then encapsulated 23 in a UL BB-Frame by the addition of a second header UL BBHeader containing information on the coding and the modulation of the UL BB-Frame 12. Then, the UL BB-Frame 12 is coded to form a UL XFEC-Frame 13 and modulated to form a UL PL-Frame 14.

According to the invention, the transport header DL BB-TH, dedicated to transporting each DL BB-Frame 15 over the downlink DL, comprises, on the one hand, information concerning the operations performed by the station on the ground and relating to the segmentation and to the encapsulation of the DL BB-Frame 15 in the UL BB-Frames and, on the other hand, information relating to the reassembly and to the extraction of the DL BB-Frame 15, to the sending of the DL BB-Frame to a predetermined modulator/coder and to the construction of the DL PL-Frames 17. Thus, the transport header DL BB-TH of each DL BB-Frame notably comprises a parameter concerning the output port of the OBP to which each DL BB-Frame must be sent, a parameter concerning the modulator DL MODCOD to be used to code and modulate the DL BB-Frame to construct the DL PL-Frame 17 before transmitting it over the downlink, an identifier DL-Id relating to the carrier frequency to be used, information concerning the length DL-FL of each DL BB-Frame and information concerning the start and the end of the different DL BB-Frames 15 incorporated in the UL BB-Frame 12 and making it possible to reassemble the DL BB-Frames in the OBP processor on board the satellite. This information notably makes it possible to indicate to the OBP on board the satellite, the modulator/coder, or set of modulators/coders, to which the DL BB-Frames must be routed.

Figure 5:
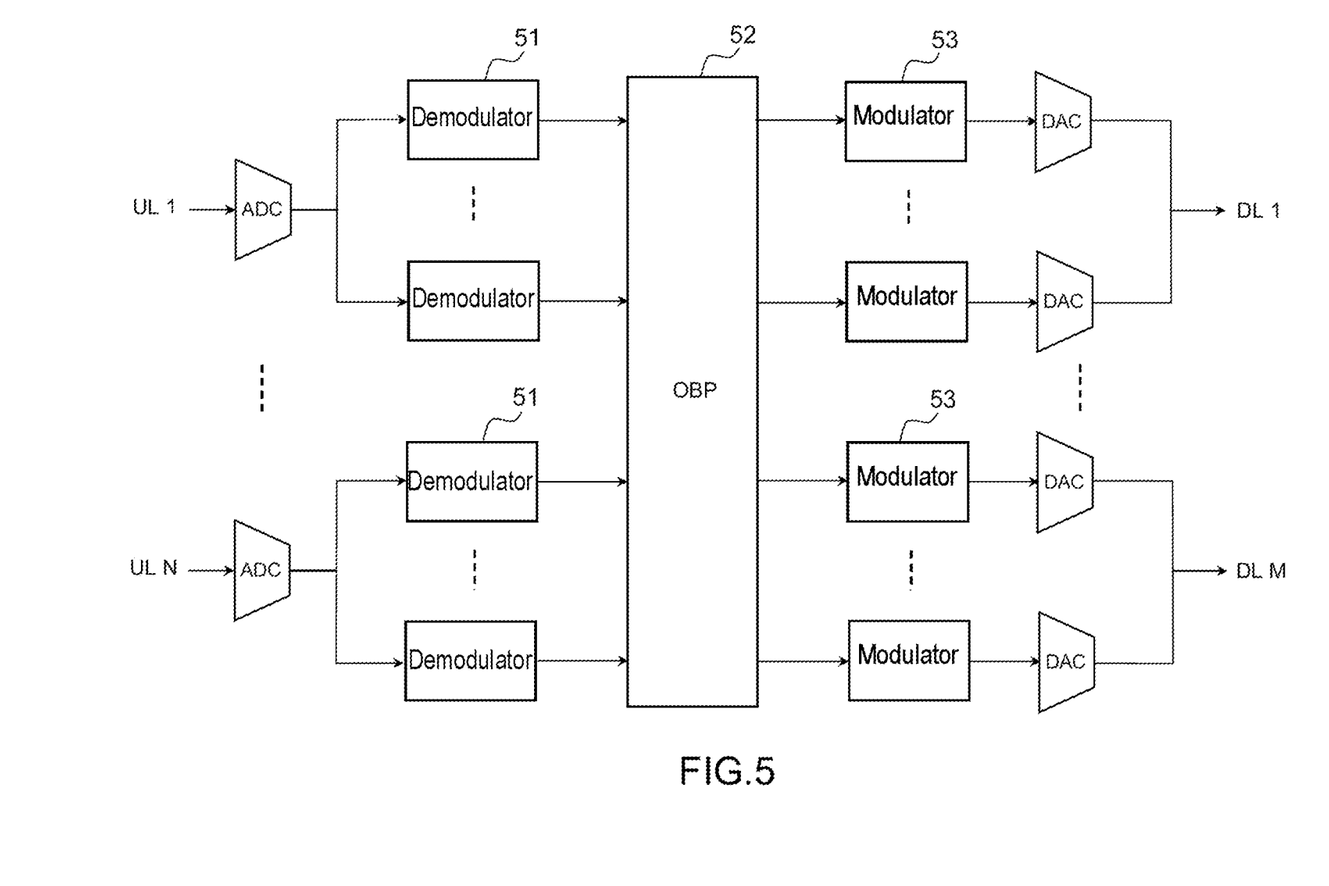
FIG. 5: a block diagram of the data transmission equipment mounted on board the satellite, according to the invention.

On board the satellite, as represented in FIG. 4 and in the block diagram of FIG. 5, the data transmission equipment mounted on board the satellite comprises a receiver comprising N inputs capable of receiving 31 UL PL-Frames 14 originating from N uplinks UL1, . . . , ULN, each input being connected to a plurality of demodulators 51 capable of demodulating and decoding 32 the UL PL-Frames 14 received, an OBP processor 52 capable of extracting 40 and of routing 41 the DL BB-Frames, a plurality of modulators/coders DL MODCOD 53 capable of coding and modulating 38 the DL BB-Frames routed by the OBP 52 to construct the DL PL-Frames to be transmitted 39 over a downlink, each modulator 53 being connected to an output of the OBP, and a transmitter comprising M downlinks DL1, . . . , DLM connected at the output of the modulators/coders 53, M and N being integer numbers greater than 1. The demodulators 51 decode the UL PL-Frames received over the uplinks to extract from them the UL XFEC-Frames and demodulate the UL XFEC-Frames to extract from them 32 the UL PL-Frames, then extract from them 40 the DL BB-Frames. The DL BB-Frames obtained from each demodulator 51 are transmitted to the OBP 52 which, based on the identifier DL-Id of the modulator/coder 53 of the downlink introduced, by the gateway station, in the transport header DL BB-TH of each DL BB-Frame, routes 41 each DL BB-Frame to the modulator/coder corresponding to the DL-Id indicated. The modulator 53 encodes and modulates 38 the data of the DL BB-Frame to form a DL XFEC-Frame then a DL PL-Frame. The DL PL-Frame is then transmitted 39 by the transmitter, over the downlink DL1, . . . , DLM to which the output of the modulator 53 is connected, to the user terminals. On reception, the user terminals completely demodulate the DL PL-Frames received to recover the IP packets.

Thus, with the improved method according to the invention, the OBP 52 directly receives the DL BB-Frames that it must transmit to the user terminals. Furthermore, in the transport header DL BB-TH associated with each DL BB-Frame, the OBP 52 receives all the instructions needed for the extraction, the reassembly, the modulation and the coding of each DL BB-Frame to be transmitted over the downlink. It is no longer necessary to perform a complete demodulation of the data on board the satellite, or to process and re-fragment IP packets in the OBP 52 to construct the DL BB-Frames, which makes it possible to considerably reduce the computation and processing power needed on board the satellite. The operations performed on board the satellite are only a partial demodulation of the data of each PL BB-Frame to the DL BB-Frame level, then a routing of the DL BB-Frames by the OBP 52, to a modulator/coder DL MODCOD 53 having an identifier DL-Id that is predetermined and indicated in the transport header DL BB-TH of each DL BB-Frame. The OBP 52 on board the satellite 30 is therefore a connectivity processor because its function is solely to ensure the connections, between the uplinks and the downlinks, scheduled by the gateway station 20.

Figure 6:
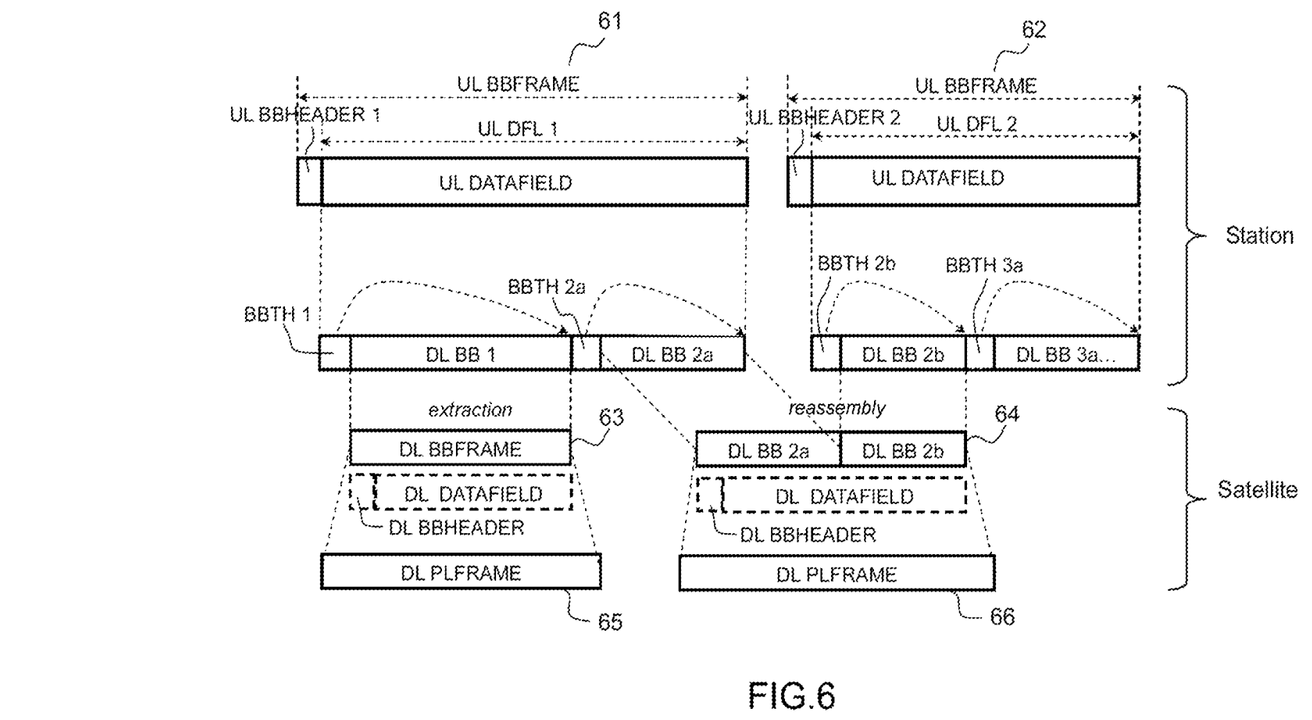
FIG. 6: a first example illustrating the construction of two successive frames UL BB-Frames in the gateway station and the extraction then the reassembly of the DL BB-Frames on board the satellite, according to the invention.
Figure 7:
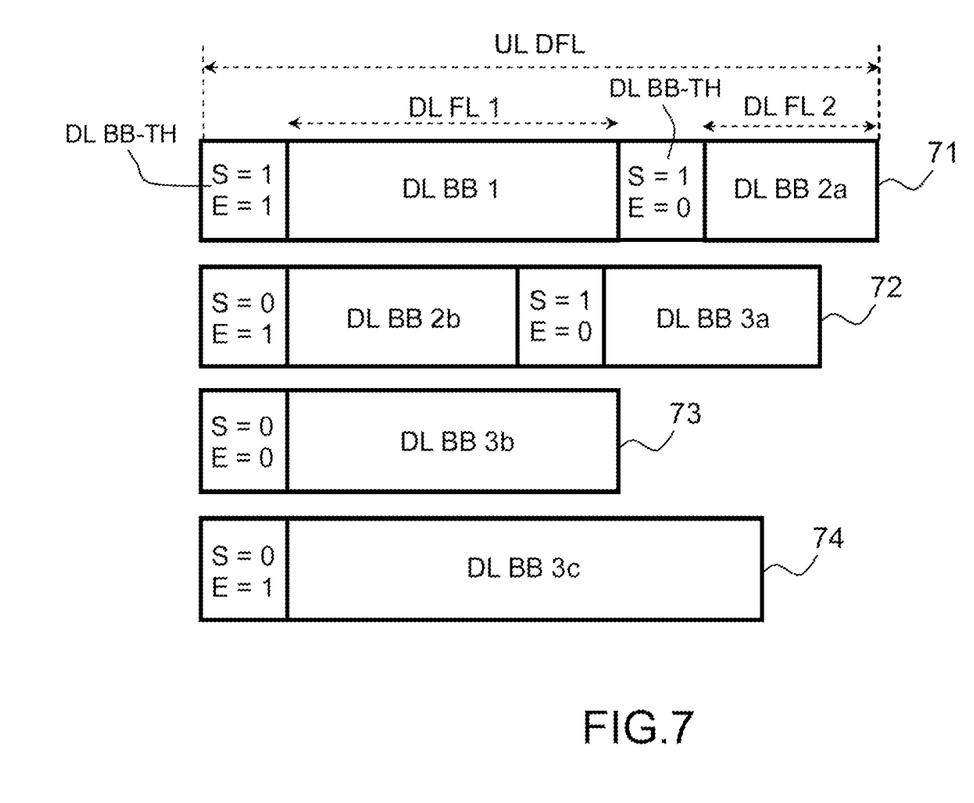
FIG. 7: a second example of several successive frames UL BB-Frames, according to the invention.

As represented in the examples of FIGS. 6 and 7, a frame UL BB-Frame is made up of a header UL BBHeader followed by a data field UL DATAFIELD (uplink data field) dedicated to the data to be transmitted over the uplink UL1, . . . , ULN. According to the invention, the data field to be transmitted over the uplink is made up of sequences of DL BB-Frames to be transmitted over the downlink, each sequence of DL BB-Frames being associated with a transport header DL BB-TH placed before the data. The length UL DFL of the data field of a UL BB-Frame is variable but is predefined in the gateway station 20, for each UL BB-Frame, and indicated in the corresponding header UL BBHeader. The total length of the field available for the DL BB-Frames, including the data associated with their respective transport header DL BB-TH, is exactly equal to this length UL DFL of the data field of the corresponding UL BB-Frame. Consequently, it is often necessary to split frames DL BB-Frames into several different fragments and to incorporate the different fragments in different consecutive UL BB-Frames. Each UL BB-Frame therefore comprises one or more sequences of DL BB-Frames, the sequences being able to be complete DL BB-Frames and/or incomplete fragments of DL BB-Frames. In the data field of each UL BB-Frame, each sequence and each fragment of DL BB-Frame is associated with a specific transport header DL BB-TH placed in front of the data of the sequence or of the corresponding fragment of DL BB-Frame. When a frame DL BB-Frame 64 has a length greater than the length of the data field available in the UL BB-Frame 61 of the uplink, the first additional preprocessing step 26 then further consists, after the pre-segmentation of the GSE packets into DL BB-Frames, in fragmenting the corresponding frame DL BB-Frame 64 into several DL BB-Frame fragments, DL BB2a, DL BB 2b, then in encapsulating each fragment with a corresponding transport header DL BB-TH BBTH2a, BBTH2b. The second additional step 27, of incorporation in the frames of the uplink UL, then consists in incorporating the different fragments of the fragmented frame DL BB-Frame 64 in different consecutive frames UL BB-Frames 61, 62, of the uplink.

Thus, for example, in FIG. 6, there are represented, on the one hand, the construction, in the gateway station, of two consecutive frames UL BB-Frames 61, 62 and, on the other hand, the extraction and the reassembly, on board the satellite, of the DL BB-Frames 63, 64 incorporated in the UL BB-Frames, by the gateway station. In the gateway station 20, each UL BB-Frame 61, 62 is constructed and comprises a header field UL BBHeader and a data field UL DATA-FIELD. The data field of each UL BB-Frame can be made up of one or more sequences of DL BB-Frames, depending on the length available in the corresponding data field which can vary from one frame UL BB-Frame to another frame UL BB-Frame. In the example of FIG. 6, the first UL BB-Frame 61 has a length UL DFL1 and is made up of two consecutive sequences of DL BB-Frames, DL BB1 and DL BB2a respectively associated with their respective transport header BBTH1, BBTH2a. The first sequence DL BB 1 is a complete frame DL BB-Frame 63 associated with a transport header BBTH1 and the second sequence is a fragment DL BB2a associated with a transport header BBTH2a, and corresponds to the start of a second incomplete frame DL BB-Frame 64. The data field of the second UL BB-Frame 62 has a length UL DFL2 and is also made up of two consecutive sequences of DL BB-Frames. The first sequence of the second UL BB-Frame 62 is made up of a first fragment DL BB2b associated with a transport header BBTH2b, and corresponds to the end of the second DL BB-Frame 64. The second sequence of the second UL BB-Frame 62 is made up of a fragment DL BB3a associated with a transport header BBTH3a, and corresponds to the start of a third incomplete DL BB-Frame. The transport headers placed before each sequence of DL BB-Frame comprise information indicating whether or not it relates to the start of the frame, information indicating whether or not the sequence includes the end of the frame and information on the length of each sequence. This information on the start, end and length of each DL BB-Frame 63, 64 enables the OBP processor 52 on board the satellite to extract, in each frame UL BB-Frame received, each sequence of DL BB-Frame DLBB1, DLBB2a, DLBB2b, etc. and reassemble the incomplete frames to reconstruct complete frames DL BB-Frame 63, DL BB-Frame 64, etc. to which are added headers DL BBHeader before transmitting them to a predetermined modulator/coder 53 to respectively obtain the DL PL-Frame 65 and DL PL-Frame 66 to be transmitted to the user terminals. The predetermined modulator/coder DL MODCOD 53 corresponds to the identifier DL-Id indicated in the transport header DL BB-TH of each DL BB-Frame.

The gain in efficiency between the uplink UL and the downlink DL is then directly linked to the ratio of the number of DL BB-Frames which are encapsulated in a UL BB-Frame according to the UL and DL coding rates and modulation types required at each instant, the UL and DL coding rates and modulation types being able to vary with each UL or DL BB-Frame. The complexity of the processing operations is then shared between the equipment on board the satellite and the equipment located in the gateway station. On board the satellite, the complexity is greatly reduced compared to the processing operations performed in the current transmission systems, and is limited to a simple processing operation of reassembly of DL BB-Frame of known size, without it being necessary to access the IP packets, while ensuring the switching of the DL BB-Frames and the replication of the traffic on the downlink DL transmission ports. The memory capacity needed on board the satellite is therefore very much reduced. In the gateway station, the computation power required takes account of the desired technological performance trends and has to be much greater than that embedded on board the satellite. In effect, the computation power in the gateway station has to make it possible to ensure the processing of the traffic to be transmitted over the downlink, including in case of traffic growth, without it being necessary to modify the user terminals.

FIG. 7 is an example showing different consecutive frames UL BB-Frames 71, 72, 73, 74 in which are incorporated one or more sequences of DL BB-Frames, the transport header DL BB-TH of each sequence of DL BB-Frame being provided with corresponding DL BB-Frame start S and end E information. As a non-limiting example, a bit of value 1 corresponds to yes and a bit of value 0 corresponds to no. The first frame UL BB-Frame 71 is made up of two consecutive sequences DL BB1 and DL BB2a. The transport header DL BB-TH associated with the sequence DL BB1 comprises the information S=1 and E=1, which means that this sequence begins and ends in said first frame UL BB-Frame 71 and that it is therefore complete. The length DL FL1 of this sequence is also indicated in the corresponding transport header. The transport header DL BB-TH associated with the sequence DL BB2a comprises the information S=1 and E=0, which means that this sequence includes the start but not the end of the second frame DL BB-Frame and that the second frame DL BB-Frame is therefore incomplete. The length DL FL of this sequence DL BB2 is also indicated in the corresponding transport header. The second frame UL BB-Frame 72 is made up of two consecutive sequences DL BB2b and DL BB3a. The transport header associated with the sequence DL BB2b includes the information S=0 and E=1, which means that this sequence does not include the start of the second frame DL BB frame but that it includes the end of said second frame DL BB-Frame and that the second frame DL BB-Frame is therefore incomplete. Concerning the third frame DL BB-Frame, it has been split into three different fragments DL BB3a, DL BB3b, DL BB3c respectively incorporated in three different successive frames UL BB-Frames, that is to say in the second, the third and the fourth UL BB-Frame 72, 73, 74. The transport header DL BB-TH of the first fragment incorporated in the second frame UL BB-Frame 72 includes the information S=1 and E=0 which indicates that this first fragment DL BB3a is the start of an incomplete DL BB-Frame. The transport header DL BB-TH of the second fragment DL BB3b incorporated in the third frame UL BB-Frame 73 includes the information S=0 and E=0 which indicates that this second fragment includes neither the start nor the end of a DL BB-Frame and therefore corresponds to an intermediate fragment. The transport header DL BB-TH of the third fragment DL BB3c incorporated in the fourth frame UL BB-Frame 74 includes the information S=0 and E=1 which indicates that this third fragment does not include the start of a DL BB-Frame but it does include the end of it and that it is the last fragment.

Although the invention has been described in relation to particular embodiments, it is clear that it is in no way limited thereto and that it includes all the technical equivalents of the means described and their combinations provided the latter fall within the scope of the invention.

The invention claimed is:

1. A method for transmitting data by satellite between a gateway station and user terminals, the data being transmitted to the satellite by the gateway station over an uplink (UL) in the form of a succession of frames and retransmitted by the satellite over a downlink (DL) to the user terminals, the retransmission of the data over the downlink (DL) being performed after modulation with a carrier frequency, said modulation and said carrier frequency being dedicated to the corresponding downlink (DL), the method consisting, in the gateway station:

in segmenting, assembling and encapsulating the data in different successive basic frames, UL BB-Frames, that can be transmitted over the uplink, each basic frame, UL BB-Frame, comprising a header field UL BBHeader, dedicated to the uplink (UL), and a data field UL DATAFIELD to be sent over the uplink (UL), then in coding and in modulating the data of each basic frame, UL BB-Frame, to construct frames UL PL-Frames, and in sending the UL PL-Frames over the uplink (UL), wherein the method further comprises:

a first additional preprocessing step consisting, in the gateway station, in pre-segmenting the data as a function of the carrier frequency which is dedicated to the data on the downlink (DL) and in encapsulating the pre-segmented data in successive basic frames DL BB-Frames, that can be transmitted over the downlink, the encapsulation of each basic frame DL BB-Frame of the downlink consisting in adding a transport header DL BB-TH dedicated to the downlink, and a second additional step consisting, in the gateway station, in incorporating the different basic frames DL BB-Frames of the downlink, associated with their respective transport headers DL BB-TH, in the data field of the different basic frames, UL BB-Frames, of the uplink.

2. The transmission method according to claim 1, wherein the transport header DL BB-TH of each frame DL BB-Frame of the downlink comprises instructions intended for an OBP processor mounted on board the satellite, the instructions comprising at least one identification parameter DL Id of a modulator/coder to be used on the downlink, an identifier of the carrier frequency to be used, a start parameter and an end parameter indicating the start and the end of the corresponding frame DL BB-Frame, and a length parameter of the corresponding frame DL BB-Frame.

3. The transmission method according to claim 2, wherein when a frame DL BB-Frame has a length greater than the length of the data field available in the UL BB-Frame of the uplink, the first additional preprocessing step further consists, in the gateway station:

in fragmenting the corresponding frame DL BB-Frame into several fragments, then in encapsulating each fragment with a corresponding transport header DL BB-TH, and the second additional step consists, in the gateway station, in incorporating the different fragments of the fragmented frame DL BB-Frame in different consecutive frames UL BB-Frames of the uplink.

4. A method for transmitting data by satellite between a gateway station and user terminals, the data being transmitted to the satellite by the gateway station over an uplink (UL) in the form of a succession of frames and retransmitted by the satellite over a downlink (DL) to the user terminals, the retransmission of the data over the downlink (DL) being performed after modulation with a carrier frequency, said modulation and said carrier frequency being dedicated to the corresponding downlink (DL), the method consisting, in the gateway station:

in segmenting, assembling and encapsulating the data in different successive basic frames, UL BB-Frames, that can be transmitted over the uplink, each basic frame, UL BB-Frame, comprising a header field UL BBHeader, dedicated to the uplink (UL), and a data field UL DATAFIELD to be sent over the uplink (UL), then in coding and in modulating the data of each basic frame, UL BB-Frame, to construct frames UL PL-Frames and in sending the UL PL-Frames over the uplink (UL), wherein the method further comprises:

a first additional preprocessing step consisting, in the gateway station, in pre-segmenting the data as a function of the carrier frequency which is dedicated to the data on the downlink (DL) and in encapsulating the pre-segmented data in successive basic frames DL BB-Frames, that can be transmitted over the downlink, the encapsulation of each basic frame DL BB-Frame of the downlink consisting in adding a transport header DL BB-TH dedicated to the downlink, and a second additional step consisting, in the gateway station, in incorporating the different basic frames DL BB-Frames of the downlink, associated with their respective transport headers DL BB-TH, in the data field of the different basic frames, UL BB-Frames, of the uplink, wherein the transport header DL BB-TH of each frame DL BB-Frame of the downlink comprises instructions intended for an OBP processor mounted on board the satellite, the instructions comprising at least one identification parameter DL Id of a modulator/coder to be used on the downlink, an identifier of the carrier frequency to be used, a start parameter and an end parameter indicating the start and the end of the corresponding frame DL BB-Frame, and a length parameter of the corresponding frame DL BB-Frame, wherein when a frame DL BB-Frame has a length greater than the length of the data field available in the UL BB-Frame of the uplink, the first additional preprocessing step further consists, in the gateway station:

in fragmenting the corresponding frame DL BB-Frame into several fragments, then in encapsulating each fragment with a corresponding transport header DL BB-TH, and the second additional step consists, in the gateway station, in incorporating the different fragments of the fragmented frame DL BB-Frame in different consecutive frames UL BB-Frames of the uplink, the transmission method further comprising, on board the satellite:

in receiving the UL PL-Frames, in demodulating and decoding the data of the frames UL PL-Frames received to extract from them the UL BB-Frames then, from each UL BB-Frame, in extracting the fragments of DL BB-Frames and in reassembling the fragments to reconstruct the complete DL BB-Frames, in routing each DL BB-Frame to the modulator/coder corresponding to the identifier DL Id indicated in the specific header DL BB-TH of said DL BB-Frame, then in transmitting the modulated and coded frames over the downlink DL.

\* \* \* \* \*